(12) United States Patent
Borges et al.

(10) Patent No.: US 7,323,636 B1
(45) Date of Patent: Jan. 29, 2008

(54) AERIAL CABLE SPACER WITH CABLE RETAINING ARM HAVING NON-RECTANGULAR PLUS-SHAPED CROSS SECTION AND ANGLED PAWL LOCKING MEMBER

(75) Inventors: Paulo Sergio Pinto Borges, Santana de Parnaiba (BR); Carlos Alberto Fernandes, Parque da Represa - Jundiai (BR)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 11/450,121

(22) Filed: Jun. 9, 2006

(51) Int. Cl.
*H02G 7/06* (2006.01)
(52) U.S. Cl. .............. 174/41; 174/40; 174/43; 174/44; 248/61; 403/106
(58) Field of Classification Search ................ 174/41, 174/43, 44, 46, 146, 147, 144, 40; 248/61, 248/74.1, 74.2; 403/106, 107
See application file for complete search history.

(56) References Cited

U.S. PATENT DOCUMENTS

| 3,254,151 | A | * | 5/1966 | Myers ...................... 174/40 R |
| 3,803,345 | A | * | 4/1974 | Spaeth, Jr. .............. 174/149 R |
| 4,020,277 | A | | 4/1977 | La Chance, Sr. et al. |
| 5,700,980 | A | * | 12/1997 | Bello et al. ................. 174/146 |
| 6,047,930 | A | | 4/2000 | Bello |
| 6,170,783 | B1 | | 1/2001 | Bello |
| 6,303,856 | B1 | | 10/2001 | Bello |

* cited by examiner

*Primary Examiner*—Dhiru R. Patel
(74) *Attorney, Agent, or Firm*—Fay Sharpe LLP (57) ABSTRACT

An aerial cable spacer is provided with a cable retainer and vertically disposed strengthening tabs or ribs. The cable retainer includes a cable retaining arm. A mid portion of the cable retaining arm has a non-rectangular plus "+" shaped cross section. The plus "+" shaped cross section engages and exerts a force on the cable as the cable retaining arm bends to a closed position. The arm is flexible so as to create a resilient force in conjunction with the plus "+" shaped cross section to securely hold the cable on a cable seat of a main body portion of the aerial cable spacer. A pawl is carried on the arm at a predetermined orientation to engage a corresponding set of teeth on the spacer body for enhanced cable clamping force.

19 Claims, 6 Drawing Sheets

AERIAL CABLE SPACER WITH CABLE RETAINING ARM HAVING NON-RECTANGULAR PLUS-SHAPED CROSS SECTION AND ANGLED PAWL LOCKING MEMBER

FIELD OF THE INVENTION

The present application relates to apparatus for supporting one or more cables above the ground, and more particularly to an aerial cable spacer apparatus and to a cable retainer for use with aerial cable spacers, the cable retainer including a latching cable retaining arm with a non-rectangular, preferably plus ("+") shaped, cross section providing improved clamping capability for holding associated cables on the spacer body. The arm further includes an engagement pawl carried on the arm at a preselected angle for improved cable holding strength.

BACKGROUND

The present exemplary embodiments relate to spacers for aerial cables and to cable retainers for holding the cables relative to the spacers. They find application in conjunction with spacers for power distribution cables, and will be described with particular reference thereto. However, it is to be appreciated that the present exemplary embodiments are also amenable to other like applications including anywhere elongate objects are to be held in a spaced apart relationship.

Overhead utility cables are commonly suspended from a messenger cable typically made of a high strength metal alloy. The messenger cables are strung between spaced apart towers, utility poles, and the like throughout various areas for purposes of supporting utility cables such as power distribution cables into those areas. In typical large scale applications, three phase power is distributed into residential or commercial areas. One example is 15 kv three phase power carried on three separate conductors and distributed into the service area suspended under messenger cables supported on poles or towers in the manner described above.

It is to be appreciated that current carrying conductors should not be permitted to come into contact with each other. Insulation on jacketed conductors can be worn away and, of course, contact between uninsulated conductors would result in a short circuit fault in the grid system. Therefore, typically, the power conductors are carried below the messenger cable by an aerial cable spacer device. A primary function of the spacer is to suspend the power cables from the messenger cable and carry the cables throughout the service area. Another function of the spacer device is to establish and maintain a predefined distance between the power conductors for various reasons such as, for example, to control system characteristics including material reactive impedance characteristics.

One prior art aerial cable retainer device is shown in U.S. Pat. No. 4,020,277 which shows a basic spacer for supporting a set of three electrical conductor cables above the ground. The spacer taught there includes a body member having four concave seats including one downwardly oriented seat adapted to receive a messenger cable and three upwardly oriented seats adapted to receive as many power conductor cables. Each of the concave seats is associated with at least one generally arcuate cable retaining arm for engaging a surface of the conductor cable and messenger cable and holding them in their respective seats. One end of each of the cable retaining means is pivotally connect with the body member and ratchet tooth means in the form of a pawl is provided on the other free end of the cable retaining arm. A set of ratchet tooth means are also provided on the spacer body member outwardly of the concave seats and are generally arranged in the shape of an arc. The teeth of the retainer arms are engageable with the teeth of the body member ratchet tooth means when the retaining arms are rotated about their pivotal supports thereby to hold the conductor cables and messenger cable in their respective concave seats. It has been found at times, however, that the prior art spacers of this type experience a less than desirable force exerted against the cables held in their respective concave seats. In addition, in the prior devices, it was difficult to close the cable retainer with sufficient force exerted on the cable.

U.S. Pat. No. 6,047,930 teaches a cable retaining arm in a spacer for aerial cables of the type described in the '277 patent but includes an additional fulcrum point carried on the arm. The fulcrum point engages and exerts a force on the cable as the cable retaining arm bends to a closed position. However, the cable retaining arm taught in the '930 patent is difficult to manufacture, adds cost to the device due to the additional materials needed to form the fulcrum point, and presents potential inherent stress and fracture areas adjacent either side of the fulcrum point section as the cable retaining arm is biased into position across the respective cable.

U.S. Pat. No. 6,170,783 proposes a further modification to a cable retaining arm in a spacer for aerial cables of the type described in the '277 patent. In the '783 patent, a resilient pad is secured to either or both of the cable seat on the spacer main body member as well as on the cable retaining arm. When a cable is located in the cable seat and the cable retaining arm is closed upon the cable, the resilient pad is compressed and is said to act like a spring to maintain a force on the cable. The resilient pad concept applied to the cable retaining arms of a spacer for aerial cables as proposed in the '783 patent adds further complexity and cost to the product and, it is believed, invites mechanical failure in the arm in the high-stress regions adjacent either side of the resilient pad.

Lastly, U.S. Pat. No. 6,303,856 proposes various means for providing an anti-dislodging cable retainer in a cable spacer device of the type taught in the '277 patent. In the '856 patent, either a slot or a groove are formed on respective opposite ones of the cable retaining arm and the cable seat on the body member for establishing a mechanical interlock between a ratchet tooth carried on the cable retaining arm and a plurality of spaced apart ratchet teeth formed on the spacer body member. The abutment surfaces described in the '856 patent introduce manufacturing burdens and complexities in the final product.

Thus, there is a need in the art for improved aerial cable spacers which are easy to manufacture and use and for cable retaining arms with enhanced clamping and cable holding capabilities for connecting associated cables with cable spacer bodies of aerial cable spacers.

BRIEF DESCRIPTION

The present application is directed to aerial cable spacers and to cable retaining arms which overcome the above noted and other problems found in the prior art.

In a first embodiment, an aerial cable spacer includes a main body portion and a cable retaining arm. The main body portion has a cable seat with a cable engaging surface, a first side adjacent the cable seat, and second side adjacent the cable seat and opposite from the first side. The cable retaining arm has a first end pivotally connected to the second side adjacent to the cable seat, a second end releasably engageable with the first side adjacent to the cable seat, and a mid portion having a non-rectangular shaped cross section whereby the cable retaining arm is configured to close upon a cable positioned on the cable seat and flex so as to create a resilient force in conjunction with the non-rectangular cross section to securely hold the cable on the cable seat of the main body portion.

In accordance with another aspect of the application, the mid portion of the cable retaining arm has a plus ("+") shaped cross section.

In accordance with yet a further aspect of the application, the mid portion of the cable retaining arm has an oval shaped cross section.

Still further, in accordance with yet another aspect of the application, the cable retaining arm has first and second parallel arms, each arm having a first end pivotally connected to the second side adjacent to the cable seat, a second end releasably engageable with the first side adjacent to the cable seat, and a mid portion having a non-rectangular shaped cross section whereby the cable retaining arm is configured to close upon a cable positioned on the cable seat and flex so as to create a resilient force in conjunction with the non-rectangular cross section of the arms to securely hold the cable on the cable seat of the main body portion.

In accordance with yet a further aspect of the application, the mid portion of each of the first and second parallel arms of the cable retaining arm has a plus ("+") shaped cross section.

In accordance with yet a still further aspect of the application, the mid portion of each of the first and second parallel arms of the cable retaining arms has an oval shaped cross section.

Still further, the subject aerial cable spacer includes a first set of ratchet teeth at the first side of the main body portion and a second set of ratchet teeth on the second end of the cable retaining arm, the first and second set of ratchet teeth being mutually releasable.

Still further, in accordance with yet another aspect, the second set of ratchet teeth include a single pawl carried at the second end of the cable retaining arm and oriented at a predetermined angle to releasably engage the first set of ratchet teeth on the first side of the main body portion.

Still further, in accordance with yet a further aspect of the present application, the mid portion of the cable retaining arm has an outer surface and an inner surface facing the cable seat and adapted to engage an associated cable positioned on the cable seat when the retaining arm is closed on the cable. The pawl is oriented to generally extend from the second end of the cable retaining arm towards the first end of the cable retaining arm and from the outer surface towards the inner surface. In their preferred form, the first set of ratchet teeth at the first side of the main body portion are provided to define a curved line arranged to generally approximate a circle having a center located on the main body portion. The pawl carried at the second end of the cable retaining arm is selectively received in the first set of ratchet teeth at an angle of about 30 degrees at an initial clamping position to an angle of about 60 degrees at a final clamping position relative to a line tangent to said circle. The range of engagement angles is advantageously enabled by the curved line (non-circular) arrangement of ratchet teeth on the spacer body.

These and other aspects of the subject application will be described in greater detail below with reference to the drawing figures.

DETAILED DESCRIPTION

Figure 1:
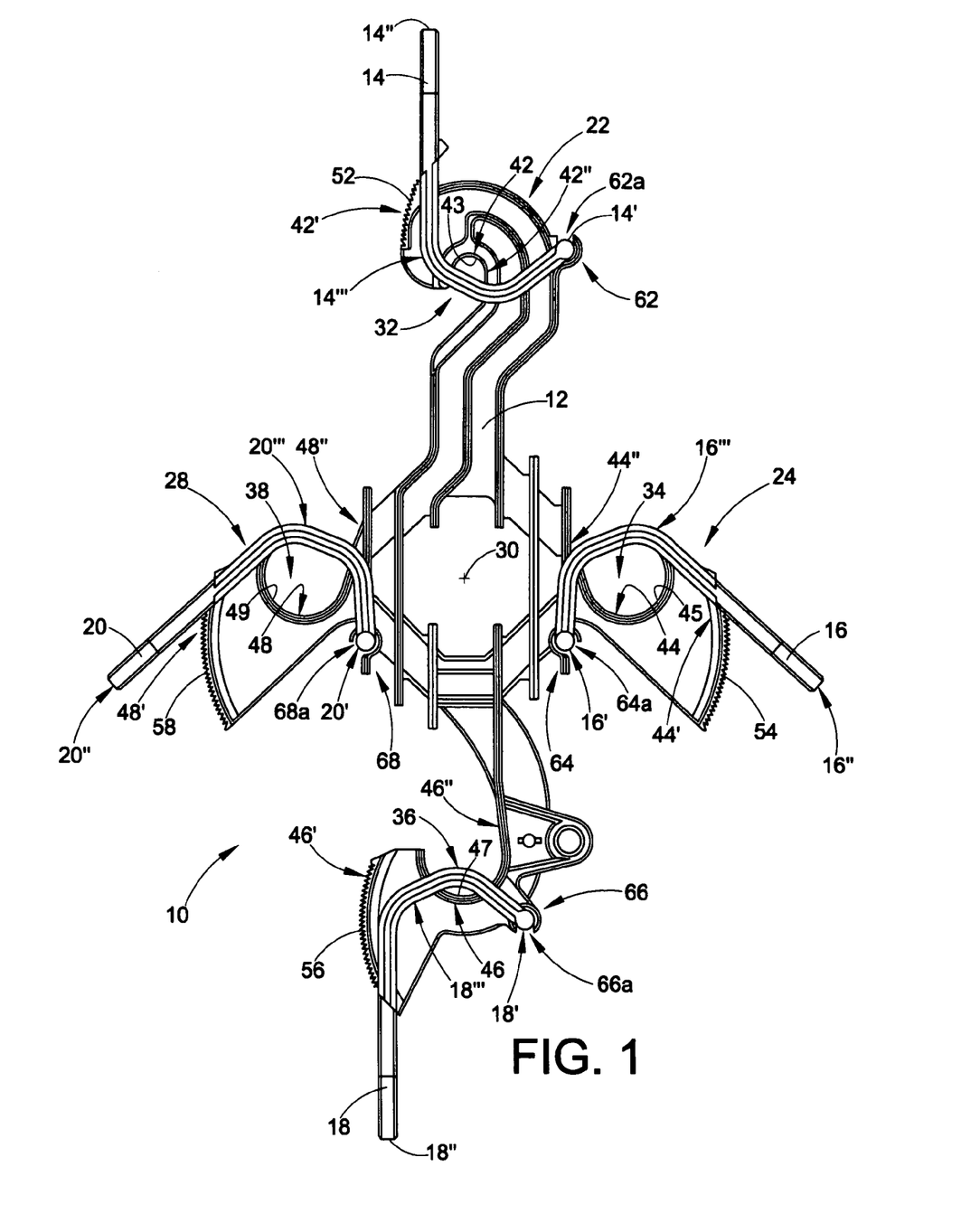
FIG. 1 is an elevational view of a cable spacer in accordance with a preferred embodiment showing each of the cable retaining arms in an engaged position relative to the spacer body and with two of the arms adapted to receive power conductor cables, one of the arms adapted to receive a messenger cable, and the last arm being disposed in a fully closed position.
Figure 2:
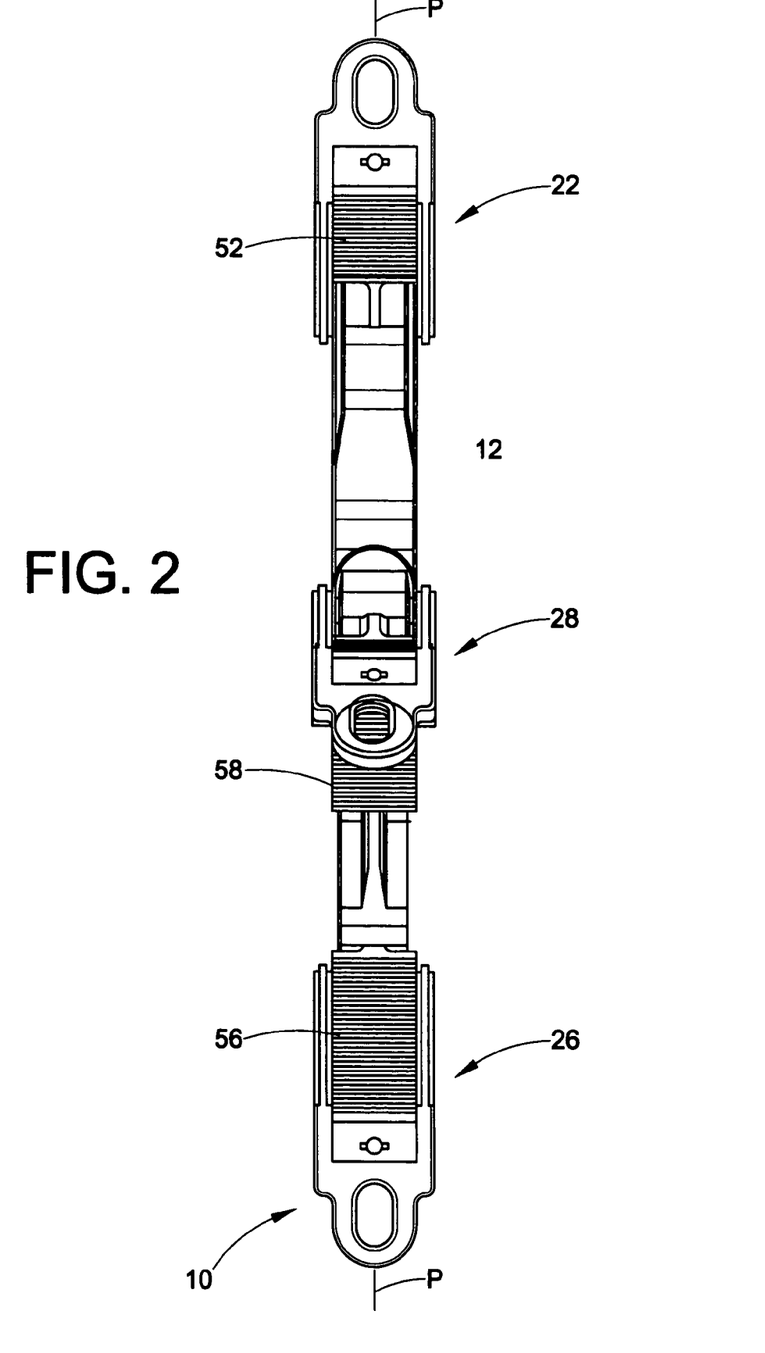
FIG. 2 is a side elevational view looking from the left to right at the spacer of FIG. 1.

With reference now to the drawings wherein the showings are for purposes of illustrating the preferred embodiments of the invention only and not for purposes of limiting same, FIG. 1 shows an aerial cable spacer 10 including a main body member 12 and a set of generally arcuate cable retaining arms 14, 16, 18, and 20, each having a first end 14', 16', 18', and 20' pivotally connected with the main body member 12, a second end 14", 16", 18", and 20" releasably engageable with the main body member 12 in a manner to be described below, and a flexible mid portion 14''', 16''', 18''', and 20'''. In their preferred form, each of the cable retaining arms 14-20 are identical. In addition, both the body member and the retaining arms are made from the same thermoplastic material, preferably a resilient high-density polyethylene which has a low dielectric constant with good weather, UV, and strength characteristics. The cable retaining arms are molded separately from the body and attached thereto using a simple snap fit operation as will become apparent in the description below.

Overall, the main body member 12 and the cable retaining arms 14-20 define a set of cable retaining means 22, 24, 26, and 28 adapted for holding associated cables in place relative to the subject spacer 10. Preferably, the first and third cable retaining means 22 and 26 are formed on opposite sides of a virtual center point 30 of the main body member 12. Similarly, the second and fourth cable retaining means 24, 28 are formed on opposite sides of the virtual center point 30. In the preferred form of the subject axial cable spacer 10, each of the cable retaining means 22-28 are circumferentially spaced apart evenly about an imaginary circle lying in plane defined by the main body member and centered on the virtual center point 30.

Figure 3:
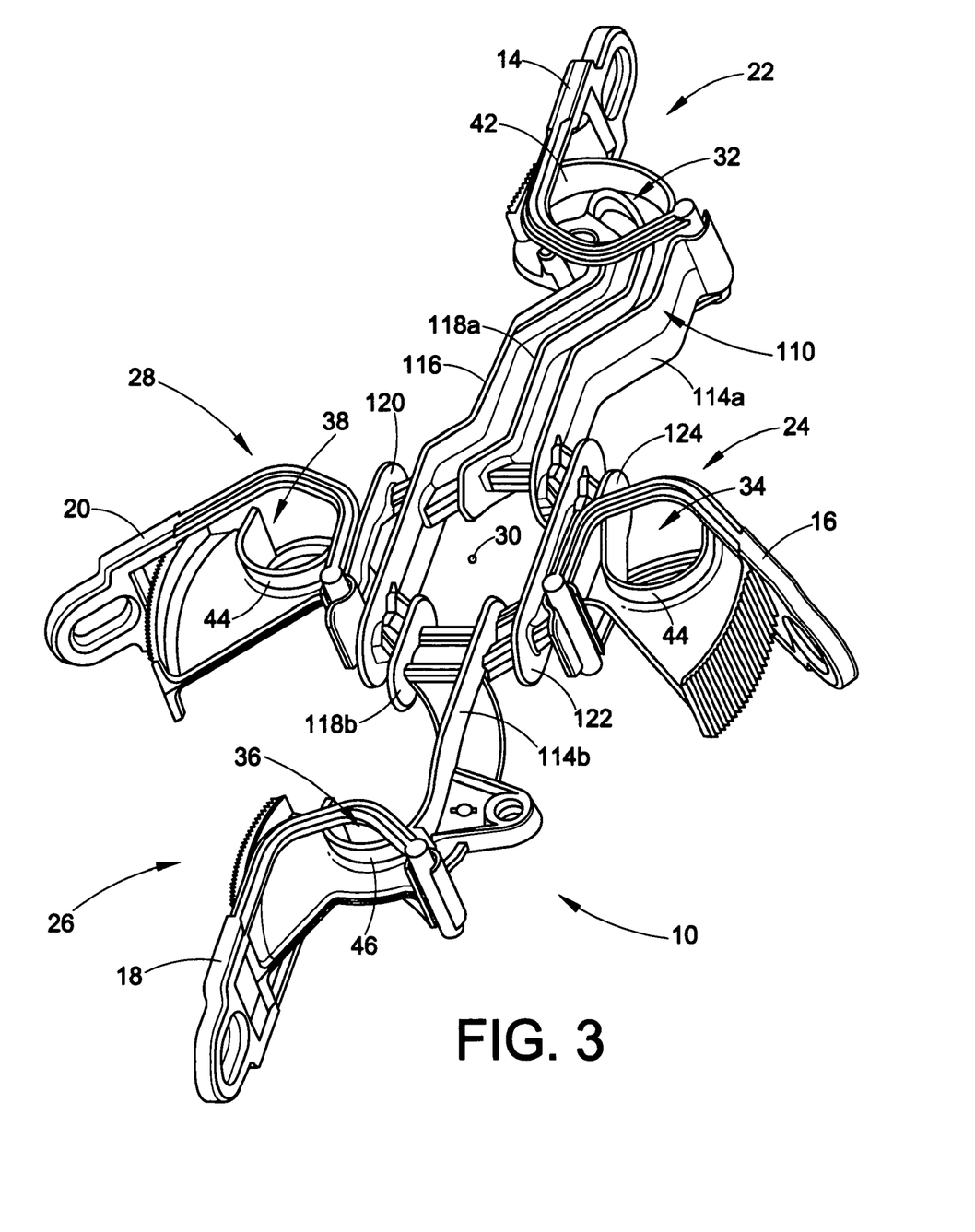
FIG. 3 is a perspective view of the spacer of FIG. 1 rotated slightly clockwise, forward, and to the left.

As best shown in FIGS. 1 and 3, the cable retaining means are configured for holding cables relative to the body portion. Particularly, the first cable retaining means 22 is adapted to receive an associated messenger cable (not shown) while the remaining cable retaining means 24-28 are adapted to receive associated power conducting cables (not shown). Those skilled in the art would appreciate that the first cable retaining means 22 has slightly smaller dimensions than the other cable retaining means 24, 26, and 28 because power conducting cables are typically larger than the messenger cables used to suspend the spacer and the power cables.

The first cable retaining means 22 is comprised of the first cable retaining arm 14 and a first cable retention area 32 formed by the main body member 12. Preferably, the first cable retention area 32 has a size and shape adapted to receive a messenger cable therein. The second, third, and fourth cable retaining means 22, 26, and 28 are comprised of, respectively, cable retaining arms 16, 18, and 20 together with second, third, and fourth cable retention areas 34, 36, and 38 defined by the main body member. As can be seen from the drawing figures, each of the second, third, and fourth cable retention areas 34, 36, and 38 are identically formed in order to receive a set of like-sized power conducting cables forming a conductor set as understood by those skilled in the art.

Each of the cable retention areas 32, 34, 36, and 38 include a corresponding generally concave cable seat 42, 44, 46, and 48 defined by the main body member 12. As noted above and shown in the figures, each of the cable seats 44, 46, and 48 are substantially identical and the other cable seat 42 is similar but smaller. Each of the cable seats 42, 44, 46, and 48 defines a corresponding cable engaging surface 43, 45, 47, and 49, respectively between opposite first 42', 44', 46', and 48' and second 42", 44", 46", and 48" sides.

The main body member 12 is further provided with four generally arcuate ratchet tooth means 52, 54, 56, and 58 located outwardly from the concave cable seats 42, 44, 46, and 48. In their preferred form, the ratchet tooth means 52, 54, 56, and 58 define a curved surface or line to generally approximate a circle. Still further, each of the cable retention areas includes a semi-cylindrical socket 62, 64, 66, and 68 which are located adjacent to the sides of the cable seats 42, 44, 46, and 48, respectively. Further, each of the sockets 62, 64, 66, and 68 are located adjacent to the sides of the cable seats 42, 44, 46, and 48 which are opposite to the sides of the seats on which the body ratchet tooth means 52, 54, 56, and 58 are disposed. Each of the sockets are provided with slots 62a, 64a, 66a, and 68a which are formed in part between opposed flanges forming the socket and integral with the main body member 12. The slots enable the cable retaining arm to be assembled onto the main body member by snap fitting a portion of each arm into a respective socket through the slot.

As noted above, each of the cable retaining means 22, 24, 26, and 28 includes a cable retaining arm 14, 16, 18, and 20 pivotally connected with the main body member 12 and preferably at each of the semi-cylindrical sockets 62, 64, 66, and 68, respectively. In the preferred form of the subject cable spacer 10, each of the cable retaining arms are identically formed and, therefore, the description of the first cable retaining arm 14 which follows below applies equally to each of the second, third, and fourth cable retaining arm 16, 18, and 20.

FIGS. 4-8 best show the details of the cable retaining arm 14 forming cable retaining means 22 of the subject cable spacer 10. In their preferred form, each cable retaining arm 14 comprises a pair of spaced generally arcuate arms 70, 72 (FIGS. 4 and 6), connected together at a first end 14a by a generally cylindrical member 74 and at the other or second end 14b by a transverse member 76. The transverse member 76 is provided with a hole or perforation 78 adapted to receive an associated installation tool (not shown) for installing the cable retaining arm 14 onto the associated cable retention area of the main body member. In addition, the transverse member 76 of each of the cable retaining arms is provided with an engagement pawl 77 adapted to engage the ratchet tool means 52 formed by the main body member.

Figure 6:
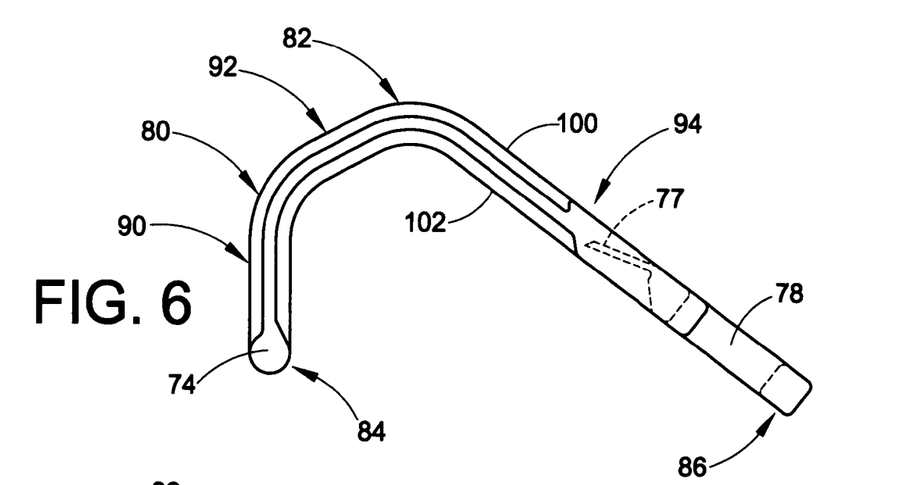
FIG. 6 is a side elevational view of the retaining arm of FIG. 5 from line 6-6.
Figure 7:
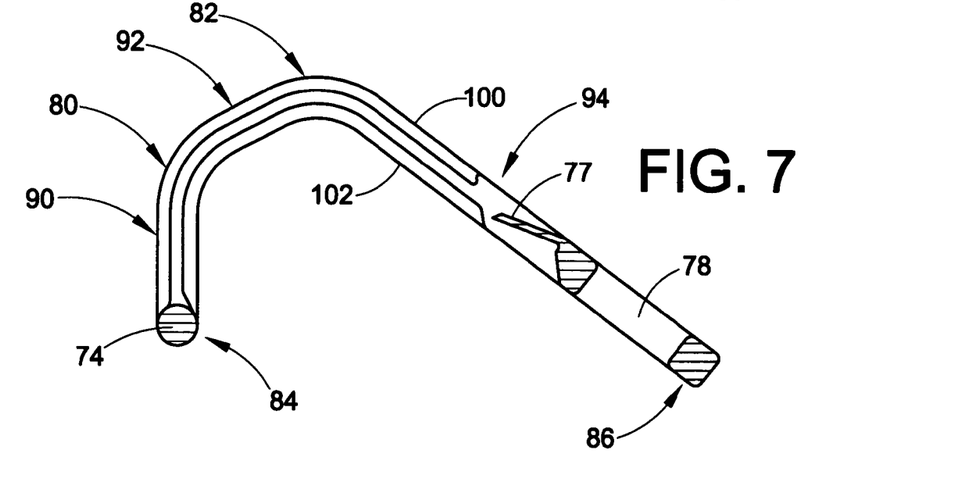
FIG. 7 is a sectional view taken on line 7-7 of FIG. 5.

FIGS. 6 and 7 show the preferred arcuate shape of each of the cable retaining arms of the subject cable spacer. As shown there, the cable retaining arm 14 has a preferred U-shaped conformation defined by a pair of spaced apart sharp curved regions 80 and 82 located between a connection end 84 and a free end 86 of the arm 14. As described above, the connection end 84 of the arm is substantially defined by the cylindrical member 74 and, therefore, is adapted for connection onto the socket 62 defined in the main body member 12. In its preferred form, the cylindrical member 74 is slightly larger than the sockets formed by the main body member. In that way, the arm is engaged more tightly with the body thereby increasing stiffness and decreasing the amount of play that the arm may have. The free end 86 of the retaining arm 14 includes the transverse member 76 provided for adapting the arm for connection with an associated tool (not shown). In its preferred from, the cable retaining arm includes a first substantially linear region 90 defined between the connection end 84 and the first sharp curved region 80. Similarly, a second linear region 92 is defined between the first and second sharp curved regions 80, 82. Lastly, a third linear region 94 is defined between the second sharp curved region 82 and the free end 86 of the cable retaining arm 14.

Preferably, the angle defined between the first and second linear regions is approximately 120 degrees and the angle between the second and third linear regions is about 120 degrees. One advantage of a cable retaining arm having spaced apart arcuate curved arms 70, 72 having a profile as shown in FIGS. 6 and 7 described above includes additional clamping force exerted on the cable installed on the subject spacer. The curved profile of the arms 70, 72 provides an "over-center" type connection of the arm relative to the cable retention areas when the pawl 77 is engaged with the ratchet tooth means 52 of the cable retention area.

Figure 8:
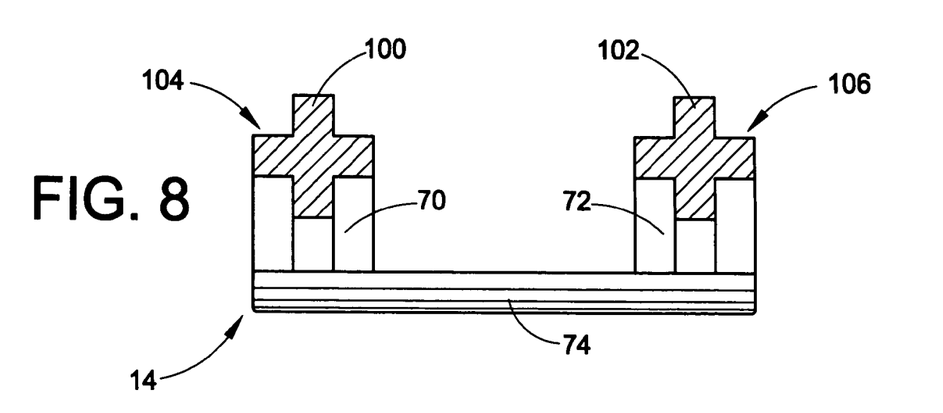
FIG. 8 is an enlarged sectional view taken at line 8-8 of FIG. 5; and, FIG. 9 is an enlarged elevational view of a conductor seat of the spacer with a major portion of the body of the spacer being broken away.

In addition to the above, preferably, each of the arms 70, 72 has a non-rectangular cross section to provide enhanced clamping forces. More particularly, FIG. 8 is a cross-sectional view taken along line 8-8 of FIG. 5. As shown there, each of the pair of spaced apart generally arcuate arms 70, 72 has a non-rectangular cross section 100, 102 as shown. Preferably, the arms have a plus ("+") shape 104, 106 as shown. However, it is to be appreciated that other non-rectangular cross sectional shapes can be used as well such as, including oval, an irregular shape or any other structural shape for example as desired.

Each of the cable retaining arms 14-20 are assembled onto the main body member 12 by simply inserting the cylindrical members 74 of the retaining arms into respective ones of the sockets 62-68 formed at each of the cable retention areas 32-38. In its preferred form, the socket is formed of a resilient thermoplastic material so that the cylindrical member is tightly received therein in order to slightly hold the cylindrical member and, thus, the retaining arm in place relative to the main body member. Preferably, only a small amount of force is required to move the retaining arm from its clamped position so that the arm can be rotated about the socket and cylindrical member whereby the central curved portions 80, 82 and the second linear region 92 can be brought into contact with the outer peripheries of the conductor cables disposed in the cable seat portion of the cable retention area. The pawl 77 of the cable retaining arm 14-20 defines a circular path upon rotation of the arm about the socket.

Figure 9:
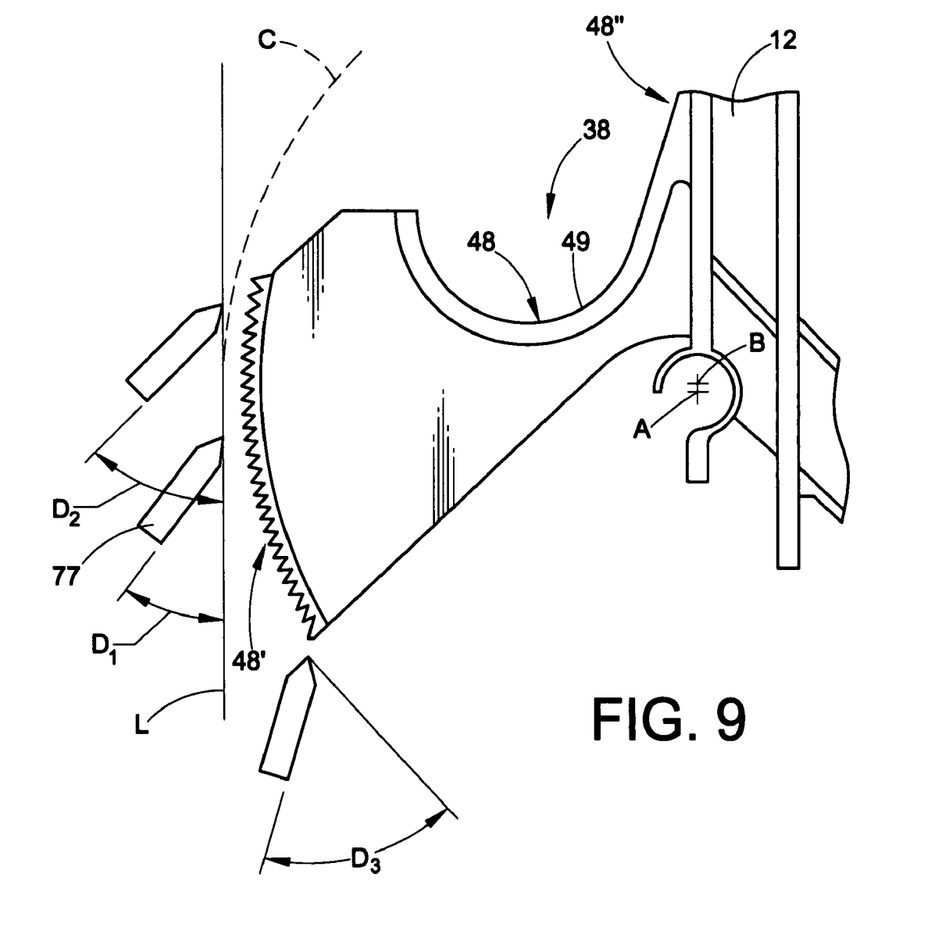

As shown in FIG. 9, the planes of the tooth means 58 intersect each other at a line A on the body member which is above and spaced upwardly of the axis B of the socket 68. Accordingly, when pressure is exerted upon the teeth of the retaining arm, the pawl tends to lock the retaining means in the closed position.

Figure 4:
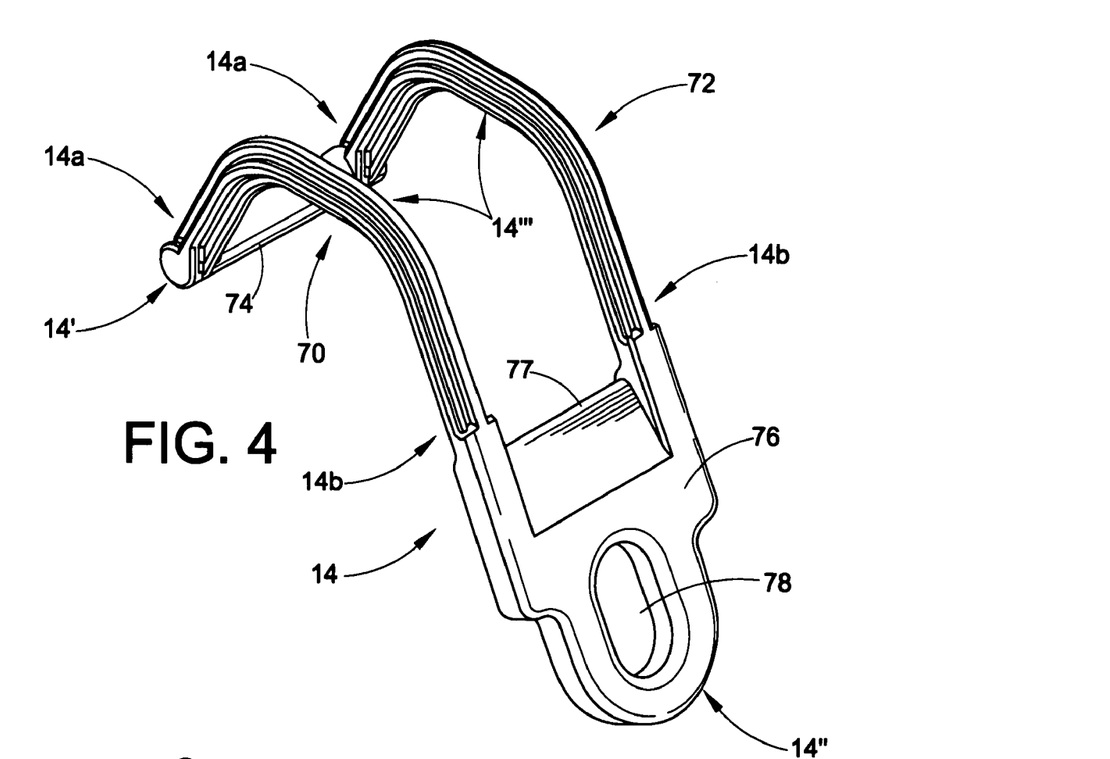
FIG. 4 is a perspective view of one of the retaining arms of the spacer of FIGS. 1-3.
Figure 5:
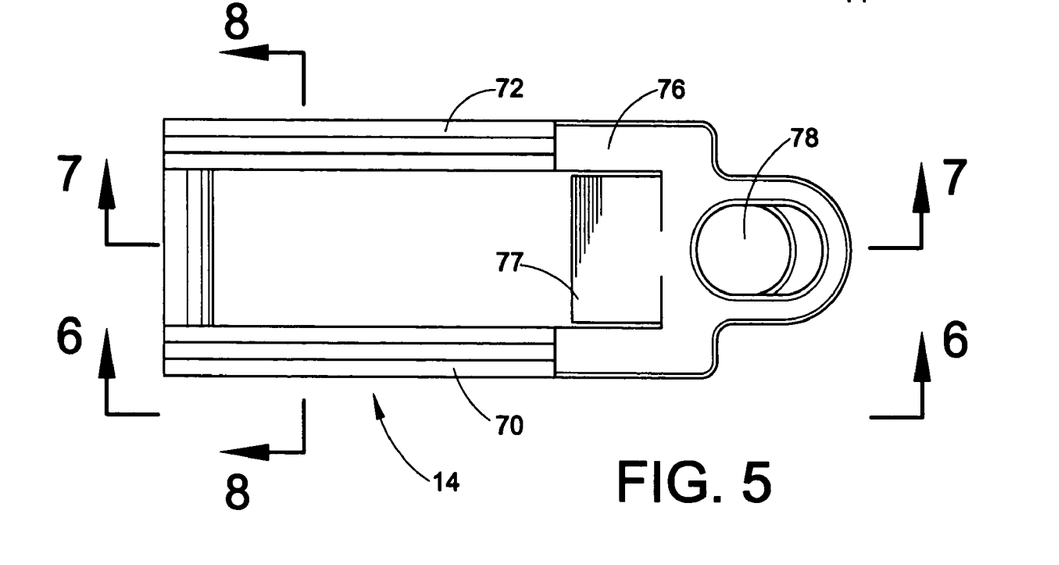
FIG. 5 is an enlarged top plan view of one of the cable retaining arm shown in FIG. 4.

FIGS. 4, 6, and 7 best illustrate the preferred formation of the pawl member 77 carried on the cable retaining arms in the subject cable spacer 10. As illustrated, each of the cable retaining arms includes an outer surface 100, and an inner surface 102. The inner surface 102 is oriented in a direction to engage an associated cable member retained in the cable retention areas formed by the subject main body member. The outer and inner surfaces defined by the third linear region 94 of each of the cable retaining arms are on opposite sides thereof. FIGS. 6 and 7 illustrate the preferred orientation of the pawl 77 relative to the outer and inner surfaces 100, 102 of the retaining arm. More particularly, the pawl 77 is preferably oriented from the outer surface 100 toward the inner surface 102 of the cable retaining arm in the third linear region 94 thereof. In addition, as is clear from the drawing figures, the pawl 77 extends from the free end 86 of the cable retaining arm toward the connection end 84 thereof. Overall, therefore, in its preferred form, the pawl 77 is carried on each retaining arm and extends therefrom in a direction extending from the outer surface 100 toward the inner surface 102 and from the free end 86 toward the connection end 84 thereof.

FIG. 9 shows the preferred engagement angle D of about 45 degrees of the pawl when the arm (not shown) is received onto the main body member at a midway clamped position with the pawl engaged into the ratchet teeth 58 of the main body member. The preferred angle $D_1$ illustrated is about 45 degrees relative to a line L tangent to the arc C forming an imaginary circle centered about the axis B described above. It is to be appreciated that the ratchet teeth 58 lie on a curved non-circular line and, therefore, the pawl engages the teeth at an angle $D_2$ of about 30 degrees in an initial clamping position of the retaining arm (not shown) to an angle $D_3$ of about 60 degrees at a final clamping position. The curved line C defined by the ratchet teeth 58 are arranged to approximate a circle having a midpoint B which is offset from a pivot center of the retaining arm portion.

The configuration and orientation of the pawl 77 relative to the ratchet tooth means 58 formed on the main body member in accordance with the preferred embodiment of the subject axial cable spacer ensures that the retaining arms are held in a closed position thereby clamping the associated cable onto the main body member with an enhanced force over prior art methods and devices.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An aerial cable spacer comprising:
  a main body portion having: i) a cable seat defining a cable engaging surface; ii) a first side adjacent the cable seat; and, iii) a second side adjacent the cable seat and opposite from the first side; and,
  a cable retaining arm having: i) a first end pivotally connected to the second side of the main body portion adjacent said cable seat, ii) a second end releasably engageable with the first side of the main body portion adjacent said cable seat, and iii) a flexible mid portion having a non-rectangular shaped cross section whereby the cable retaining arm is configured to close upon a cable positioned on the cable seat and flex so as to create a resilient force in conjunction with the non-rectangular shaped cross section to securely hold the cable on the cable seat of the main body portion.

2. The cable spacer according to claim 1 wherein the mid portion of said cable retaining arm has a plus (+) shaped cross section.

3. The cable spacer according to claim 1 wherein the mid portion of said cable retaining arm has an oval shaped cross section.

4. The cable spacer according to claim 1 wherein said cable retaining arm includes a pair of spaced apart parallel arms, each arm having a flexible mid portion with a non-rectangular shaped cross section.

5. The cable spacer according to claim 4 wherein the flexible mid portion of each of said spaced apart parallel arms has a plus (+) shaped cross section.

6. The cable spacer according to claim 1 wherein said main body portion includes a first cable seat having a first cable engaging surface, and a plurality of second cable seats, each having a second cable engaging surface, wherein said first cable seat is adapted to receive an associated messenger cable and each of said second cable seats are adapted to receive associated current carrying power conductors having a size larger than said associated messenger cable.

7. The cable spacer according to claim 1 further including:
  a first set of ratchet teeth at said first side of the main body portion; and,
  a second set of ratchet teeth at said second end of the cable retaining arm, the first and second set of ratchet teeth being mutually releasably engageable.

8. The cable spacer according to claim 7 wherein said second set of ratchet teeth includes a single pawl carried at said second end of the cable retaining arm and oriented at a predetermined angle to releasably engage said first set of ratchet teeth on the first side of the main body portion.

9. The cable spacer according to claim 8 wherein:
  said mid-portion of the cable retaining arm has an outer surface directed away from said cable seat and an inner surface directed towards said cable seat and adapted to engage an associated cable positioned on the cable seat when the retaining arm is closed on the cable; and,
  said pawl is oriented to generally extend from said second end of the cable retaining arm towards the first end of the cable retaining arm and from said outer surface towards said inner surface.

10. The cable spacer according to claim 9 wherein:
  said first set of ratchet teeth are arranged to define a portion of a curved line having a center on said main body portion; and,
  said pawl is selectively received in said first set of ratchet teeth at an angle of about 45 degrees relative to a line tangent to said portion of said curved line.

11. A cable retaining arm for use with an associated aerial cable spacer including a main body portion having a cable seat defining a cable engaging surface; a first side of the main body portion adjacent the cable seat; and, a second side of the main body portion adjacent the cable seat and opposite from the first side, the cable retaining arm comprising:

a first end of the cable retaining arm, the first end being pivotally connected to the second side of the main body portion adjacent said cable seat, a second end of the cable retaining arm, the second end being releasably engageable with the first side of the main body portion adjacent said cable seat, and a flexible mid portion having a non-rectangular shaped cross section whereby the cable retaining arm is configured to close upon a cable positioned on the cable seat and flex so as to create a resilient force in conjunction with the non-rectangular shaped cross section to securely hold the cable on the cable seat of the main body portion.

12. The cable retaining arm according to claim 11 wherein said mid portion has a plus (+) shaped cross section.

13. The cable retaining arm according to claim 11 wherein said mid portion has an oval shaped cross section.

14. The cable retaining arm according to claim 11 wherein said mid portion includes a pair of spaced apart parallel arms, each arm having a flexible mid portion with a non-rectangular shaped cross section.

15. The cable retaining arm according to claim 14 wherein the flexible mid portion of each of said spaced apart parallel arms has a plus (+) shaped cross section.

16. The cable retaining arm according to claim 11 wherein the associated aerial cable spacer includes a first set of ratchet teeth at said first side of the main body portion, and further including:

a second set of ratchet teeth at said second end of the cable retaining arm, the first and second set of ratchet teeth being mutually releasably engageable.

17. The cable retaining arm according to claim 16 wherein said second set of ratchet teeth includes a single pawl carried at said second end of the cable retaining arm and oriented at a predetermined angle to releasably engage said first set of ratchet teeth on the first side of the main body portion.

18. The cable retaining arm according to claim 17 wherein:

said mid-portion of the cable retaining arm has an outer surface directed away from said cable seat and an inner surface directed towards said cable seat and adapted to engage an associated cable positioned on the cable seat when the retaining arm is closed on the cable; and, said pawl is oriented to generally extend from said second end of the cable retaining arm towards the first end of the cable retaining arm and from said outer surface towards said inner surface.

19. The cable retaining arm according to claim 18 wherein:

said first set of ratchet teeth are arranged to define a portion of a curved line having a center on said main body portion; and, said pawl is selectively received in said first set of ratchet teeth at an angle of about 45 degrees relative to a line tangent to said portion of said curved line.

* * * * *